(12) United States Patent
Hashimoto et al.

(10) Patent No.: US 11,035,520 B1
(45) Date of Patent: Jun. 15, 2021

(54) METHOD FOR CONTROLLING COMPRESSION SYSTEM, COMPRESSION SYSTEM, AND HYDROGEN STATION

(71) Applicant: KOBE STEEL, LTD., Hyogo (JP)

(72) Inventors: Koichiro Hashimoto, Takasago (JP); Masashi Takano, Takasago (JP); Takuro Uba, Takasago (JP); Takayuki Fukuda, Takasago (JP); Kenji Nagura, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 17/070,215

(22) Filed: Oct. 14, 2020

(30) Foreign Application Priority Data

Dec. 3, 2019 (JP) .............................. JP2019-219118

(51) Int. Cl.
*F17C 5/06* (2006.01)
*F04B 41/02* (2006.01)

(52) U.S. Cl.
CPC ................ *F17C 5/06* (2013.01); *F04B 41/02* (2013.01); *F17C 2205/0335* (2013.01); *F17C 2221/012* (2013.01); *F17C 2250/032* (2013.01); *F17C 2250/043* (2013.01); *F17C 2250/0636* (2013.01); *F17C 2270/0184* (2013.01)

(58) Field of Classification Search
CPC ................. F17C 5/06; F17C 2221/012; F17C 2270/0184; F17C 2250/043; F17C 2205/0335; F17C 2250/032; F04B 41/02
USPC ........................................................... 141/4
See application file for complete search history.

(56) References Cited

U.S. PATENT DOCUMENTS

| 4,156,578 | A | * | 5/1979 | Agar ..................... F04D 27/001 415/1 |
| 4,526,513 | A | * | 7/1985 | Bogel ..................... F04B 49/02 417/18 |
| 4,971,516 | A | * | 11/1990 | Lawless .............. F04D 27/0207 415/1 |
| 6,406,268 | B1 | * | 6/2002 | Paice .................. F04D 27/0284 415/1 |
| 8,152,496 | B2 | * | 4/2012 | White ................. F04D 27/0215 417/440 |
| 2012/0121376 | A1 | * | 5/2012 | Huis In Het Veld ....................... F04D 27/0261 415/1 |
| 2014/0196814 | A1 | * | 7/2014 | Nagura ................. F17C 13/026 141/82 |

(Continued)

*Primary Examiner* — Timothy L Maust
*Assistant Examiner* — James R Hakomaki
(74) *Attorney, Agent, or Firm* — Studebaker & Brackett PC (57) ABSTRACT

A method for controlling a compression system that includes a compressor for compressing gas, a first on-off valve provided on a suction flow passage connected to a suction side of the compressor, a pressure reducing valve provided on a portion of the suction flow passage upstream of the first on-off valve, a second on-off valve provided on a discharge flow passage connected to a discharge side of the compressor, a bypass flow passage connecting the suction flow passage and the discharge flow passage to detour the compressor, and a bypass valve provided on the bypass flow passage, includes closing the first on-off valve while driving the compressor, opening the bypass valve simultaneously with or after the closing of the first on-off valve, closing the second on-off valve after the opening of the bypass valve, and continuing to drive the compressor after the closing of the second on-off valve.

7 Claims, 3 Drawing Sheets

(56) References Cited

U.S. PATENT DOCUMENTS

| | | | |
|---|---|---|---|
| 2016/0169449 A1* | 6/2016 | Allidieres | F17C 5/007 141/4 |
| 2016/0290562 A1* | 10/2016 | Okuno | F04B 41/02 |
| 2016/0348840 A1* | 12/2016 | Nagura | F04B 41/02 |
| 2019/0041003 A1 | 2/2019 | Hashimoto et al. | |
| 2021/0071815 A1* | 3/2021 | Ragot | F17C 7/04 |

* cited by examiner

METHOD FOR CONTROLLING COMPRESSION SYSTEM, COMPRESSION SYSTEM, AND HYDROGEN STATION

BACKGROUND OF THE INVENTION

Field of the Invention

The present invention relates to a method for controlling a compression system, a compression system, and a hydrogen station including the compression system.

Description of the Related Art

Conventionally, as described in JP 2017-131862 A, in a hydrogen station, a compression system is known which compresses hydrogen gas as a fuel and supplies the compressed hydrogen gas to a dispenser. The compression system has a compressor for compressing hydrogen gas and an accumulator arranged downstream thereof, and is configured to temporarily store the compressed hydrogen gas in the accumulator, and then be capable of supplying the hydrogen gas from the accumulator to the dispenser. Specifically, the compression system described in JP 2017-131862 A includes a compressor, a suction flow passage connected to a suction side of the compressor, an on-off valve provided on the suction flow passage, and a discharge flow passage connected to a discharge side of the compressor, an on-off valve provided on the discharge flow passage, an accumulator that stores the compressed hydrogen gas, a bypass flow passage detouring the compressor, and a bypass valve provided on the bypass flow passage.

JP 2017-131862 A describes a procedure for stopping an operation of the compression system at the completion of filling of the hydrogen gas into the accumulator as follows. That is, the on-off valve provided on the suction flow passage is first closed with the compressor being driving and the on-off valves provided on the suction flow passage and the discharge flow passage open. The compressor is then stopped after a lapse of a predetermined time, the on-off valve provided on the discharge flow passage is closed, and thereafter the bypass valve is fully opened.

SUMMARY OF THE INVENTION

Meanwhile, the paragraph 0051 in JP 2017-131862 A describes "The compressor 22 controlled to be stopped continues to be driven while gradually weakening the rotation of the motor, and completely stops when a time t2 elapses after the start of the stop control". The compressor 22 continues to be driven for a certain period, so that the pressure on the suction side of the compressor 22 excessively decreases, and the allowable compression ratio may be thus exceeded.

The paragraph 0052 describes "The control unit 28 having started the stop control of the compressor 22 in Step ST3 executes a close control to close the out-flow side on-off valve 233a (Step ST4)." The stop control reduces the processing amount of the compressor 22, whereby the amount of hydrogen gas sent to the accumulator may decrease, and closing the out-flow side on-off valve 233a may cause a large amount of hydrogen gas to accumulate on the discharge side of the compressor 22.

The paragraph 0053 describes "The control unit 28 having executed the close control to close the out-flow side on-off valve 233a in Step ST4 executes an opening regulation control to fully open the spill-back on-off valve 252 (Step ST5)". When a large amount of hydrogen gas is accumulated on the discharge side of the compressor 22, fully opening the spill-back on-off valve 252 may excessively increase the pressure on the suction side of the compressor 22, thus operating the safety valve.

Further, in JP 2017-131862 A, the compressor is stopped, so that the compressor is required to be restarted in order to refill the accumulator with the hydrogen gas, thus resulting in long work and great effort.

The present invention has been made in view of the above problems, and a main object thereof is to smoothly stop processing of gas by the compressor.

A method for controlling a compression system according to a first aspect of the present invention is a method for controlling a compression system that includes a compressor for compressing gas, a first on-off valve provided on a suction flow passage connected to a suction side of the compressor, a pressure reducing valve provided on a portion of the suction flow passage upstream of the first on-off valve, a second on-off valve provided on a discharge flow passage connected to a discharge side of the compressor, a bypass flow passage connecting the suction flow passage and the discharge flow passage to detour the compressor, and a bypass valve provided on the bypass flow passage. The method includes: closing the first on-off valve while driving the compressor; opening the bypass valve at the same time as the closing operation of the first on-off valve or after the closing operation of the first on-off valve; closing the second on-off valve after the opening operation of the bypass valve; and continuing to drive the compressor after the closing operation of the second on-off valve.

In the method for controlling a compression system, first, the first on-off valve is closed, so that the suction of gas into the compressor is stopped, and the amount of gas discharged from the compressor also decreases. Then, the bypass valve is opened at the same time as or after the closing operation of the first on-off valve, so that the gas discharged from the compressor is flown back to the suction flow passage through the bypass flow passage, and the pressures on the suction side and discharge side of the compressor are equalized. This allows an excessive decrease in pressure on the suction side of the compressor to be prevented and the compression ratio can be prevented from being exceeded.

Then, the second on-off valve is closed after the bypass valve is opened, so that the inflow of gas into the gas supply destination downstream of the compressor is blocked. In this way, since the bypass valve is opened before the second on-off valve is closed, the accumulation of gas on the discharge side of the compressor can be prevented, and the pressure on the suction side of the compressor can be prevented from excessively increasing when the bypass valve is opened. Therefore, according to the method for controlling a compression system, the processing of gas by the compressor can be smoothly stopped.

Further, each of the first on-off valve, the bypass valve, and the second on-off valve is operated, and the compressor continues to be driven even after the closing operation of the second on-off valve, so that the idling operation, during which the gas circulates inside the compressor through the bypass flow passage, can be continued with the pressures on the suction side and discharge side of the compressor equalized. Thus, when the supply of the compressed gas to the gas supply destination is needed to be restarted, the compressor is not required to be restarted, and it is possible to smoothly return from the idling operation to the normal operation. Therefore, the time and effort required for restarting the compressor can be reduced.

In the method for controlling a compression system described above, the bypass valve may be opened after the closing operation of the first on-off valve and when a pressure in the suction flow passage decreases to a first threshold value. The first threshold may be set based on a predetermined compression ratio of the compressor.

When the first on-off valve is closed, the suction of gas into the compressor is stopped, so that the pressure in the suction flow passage gradually decreases. Therefore, opening the bypass valve not at the same time as the closing operation of the first on-off valve but after a lapse of time after the closing operation allows the prevention of an excessive increase in pressure in the suction flow passage. Furthermore, the bypass valve starts to be opened when the pressure in the suction flow passage decreases to the first threshold value, thus allowing the prevention of the preset compression ratio being exceeded due to an excessive decrease in pressure in the suction flow passage.

In the method for controlling a compression system described above, the bypass valve may be configured to be capable of regulating an opening. The compression system may further include a buffer tank that is arranged on the suction flow passage and stores gas, and a pressure detection section that detects the pressure in the suction flow passage. The opening of the bypass valve may be increased while the pressure detected by the pressure detection section is maintained below a second threshold value.

Accordingly, even when a buffer tank having a small capacity is used, regulating the opening of the bypass valve based on the monitoring of the pressure on the suction side can prevent an excessive increase in pressure on the suction side. Therefore, when a safety valve is provided on the suction flow passage, the safety valve can be prevented from operating during the operation of the bypass valve.

In the method for controlling a compression system described above, the compression system may further include a cooler that is provided on the discharge passage and cools gas discharged from the compressor. An end portion of the bypass flow passage on the discharge side of the compressor may be connected to a part of the discharge flow passage downstream of the cooler.

Accordingly, when the bypass valve is opened and the gas is flown back from the discharge side to the suction side of the compressor, the gas cooled by the cooler can be flown back to the suction side. Therefore, there is an advantage that high heat resistance is not required in the suction flow passage.

In the method for controlling a compression system described above, during a period from the closing operation of the first on-off valve to the closing operation of the second on-off valve, and after the closing operation of the second on-off valve, the rotational speed of the compressor may be maintained at the rotational speed of the compressor before the closing operation of the first on-off valve.

In this way, even at the time of the return from the idling operation to the normal operation, the amount of gas processed by the compressor is not reduced compared with that during the normal operation before shifting to the idling operation, and the compressor is not required to be accelerated at the time of the return to the normal operation.

A compression system according to another aspect of the present invention includes: a compressor for compressing gas; a first on-off valve provided on a suction flow passage connected to a suction side of the compressor; a pressure reducing valve provided on a portion of the suction flow passage upstream of the first on-off valve; a second on-off valve provided on a discharge flow passage connected to a discharge side of the compressor; a bypass flow passage connecting the suction flow passage and the discharge flow passage to detour the compressor; a bypass valve provided on the bypass flow passage; and a control unit that controls the compressor, the first on-off valve, the second on-off valve, and the bypass valve. The control unit performs a control to close the first on-off valve while driving the compressor, open the bypass valve at the same time as the closing operation of the first on-off valve or after the closing operation of the first on-off valve, close the second on-off valve after the opening operation of the bypass valve, and continue to drive the compressor after the closing operation of the second on-off valve.

According to the compression system, the bypass valve is opened at the same time as or after the closing operation of the first on-off valve, so that an excessive decrease in pressure on the suction side of the compressor is prevented. Further, the second on-off valve is closed after the opening operation of the bypass valve, so that the accumulation of gas on the discharge side of the compressor can be prevented, and the pressure on the suction side of the compressor can be prevented from excessively increasing when the bypass valve is opened. Therefore, the processing of gas by the compressor can be smoothly stopped.

Further, each of the first on-off valve, the bypass valve, and the second on-off valve is controlled, and the compressor continues to be driven even after the closing operation of the second on-off valve, so that the idling operation, during which the gas circulates inside the compressor through the bypass flow passage, can be continued with the pressures on the suction side and discharge side of the compressor equalized. Thus, when the supply of the compressed gas to the gas supply destination is needed to be restarted, the compressor is not required to be restarted, and it is possible to smoothly return from the idling operation to the normal operation. Therefore, the time and effort required for restarting the compressor can be reduced.

A hydrogen station according to still another aspect of the present invention includes the compression system described above, the compression system for compressing hydrogen gas to a predetermined pressure, and a dispenser that refuels a fuel cell vehicle with hydrogen gas supplied from the compression system.

The hydrogen station includes the compression system described above, so that the compressor is not required to be restarted when the supply of compressed gas to the gas supply destination is needed to be restarted after the compressor has been temporarily brought in the idling operation state, and it is possible to smoothly return from the idling operation to the normal operation.

As is apparent from the above description, according to the present invention, it is possible to provide a method for controlling a compression system and a compression system, and a hydrogen station including the compression system which are capable of smoothly stopping the processing of gas by a compressor.

DESCRIPTION OF THE PREFERRED EMBODIMENTS

Hereinafter, a method for controlling a compression system, a compression system, and a hydrogen station according to embodiments of the present invention will be described in detail with reference to the drawings.

First Embodiment

The configuration of a compression system 2 and a hydrogen station 1 including the compression system 2 according to a first embodiment of the present invention will be first described with reference to FIG. 1. The hydrogen station 1 is a facility for refueling a fuel cell vehicle 100 with hydrogen gas as a fuel, and mainly includes the compression system 2 and a dispenser 3.

The compression system 2 compresses the hydrogen gas supplied from a trailer tank 16 and supplies it to the dispenser 3. As shown in FIG. 1, the compression system 2 mainly includes a compressor 10, a suction flow passage 11, a buffer tank 12, a first on-off valve 13, a pressure reducing valve 14, a safety valve 15, a first pressure detection section 51, and a discharge flow passage 21, a cooler 22, a check valve 23, a second on-off valve 24, a second pressure detection section 52, an accumulator 20, a bypass flow passage 61, a bypass valve 62, and a compression system control unit 40. Hereinafter, each of these components will be described in detail.

The compressor 10 compresses the hydrogen gas sucked from the suction flow passage 11 to a predetermined pressure (82 MPa in this embodiment), and is, for example, a reciprocating compressor. The compressor 10 in this embodiment is a multi-stage compressor in which a plurality of compression chambers (not shown) are provided in series, but the present invention is not limited to this. The compressor 10 may be a single-stage compressor in which only one compression chamber is provided.

The suction flow passage 11 is a flow passage for guiding the hydrogen gas supplied from the trailer tank 16 to a suction side (a suction port) of the compressor 10. As shown in FIG. 1, the suction flow passage 11 includes a first suction flow passage 11A having an upstream end connectable to the trailer tank 16 and a downstream end connected to an inlet of the buffer tank 12, and a second suction flow passage 11B connecting an outlet of the buffer tank 12 and the suction port of the compressor 10. The buffer tank 12 is arranged on the suction flow passage 11 and temporarily stores the hydrogen gas before being sucked into the compressor 10.

The hydrogen station 1 according to this embodiment is an off-site station in which the hydrogen gas produced at another place and transported by a trailer (not shown) is received into the station, but may be an on-site station that further includes a hydrogen production device.

The first on-off valve 13 is a valve for switching between the suction of the hydrogen gas into the compressor 10 and the stop of the suction, and is provided on the suction flow passage 11 (the first suction flow passage 11A). The first on-off valve 13 in this embodiment is an automatic control valve whose open and closed state is switched by the compression system control unit 40, but the present invention is not limited to this. The first on-off valve 13 may be a manual valve.

The pressure reducing valve 14 is a valve for reducing the pressure of the hydrogen gas supplied from the trailer tank 16, and is provided on a portion of the suction flow passage 11 (the first suction flow passage 11A) upstream (on a side of the trailer tank 16) of the first on-off valve 13. In this embodiment, the pressure reducing valve 14 regulates the pressure of hydrogen gas so that the pressure in a portion of the suction flow passage 11 downstream of the pressure reducing valve 14 is 0.6 MPa. The pressure in the trailer tank 16 is higher than the set pressure in the pressure reducing valve 14 (for example, 20 MPa), so that providing the pressure reducing valve 14 allows the hydrogen gas in the trailer tank 16 to be used all up.

The safety valve 15 is a valve for maintaining the pressure on the suction side of the compressor 10 at or below a predetermined pressure, and is provided on the second suction flow passage 11B. That is, the safety valve 15 operates (the valve opens) when the pressure on the suction side of the compressor 10 exceeds the predetermined pressure, and releases hydrogen gas from the suction flow passage 11 to the external space.

The first pressure detection section 51 is a sensor that detects the pressure of hydrogen gas in the suction flow passage 11, and is provided on a part of the second suction flow passage 11B upstream (on a side of the buffer tank 12) of the safety valve 15 in this embodiment. The first pressure detection section 51 outputs a detection signal in accordance with the pressure of hydrogen gas to the compression system control unit 40.

The discharge flow passage 21 is a flow passage for guiding the hydrogen gas compressed (pressurized) by the compressor 10 to the accumulator 20, and is connected to a discharge side of the compressor 10. As shown in FIG. 1, the discharge flow passage 21 has an upstream end connected to a discharge port of the compressor 10 and a downstream end connected to an inlet of the accumulator 20.

The cooler 22 cools the hydrogen gas discharged from the compressor 10, and is provided on a portion of the discharge flow passage 21 in the vicinity of the discharge port of the compressor 10 (on the side of the compressor 10 of the check valve 23). The cooler 22 is, for example, a heat exchanger that cools the compressed hydrogen gas by heat exchange with a cooling medium such as cooling water, but the present invention is not limited to this.

Figure 1:
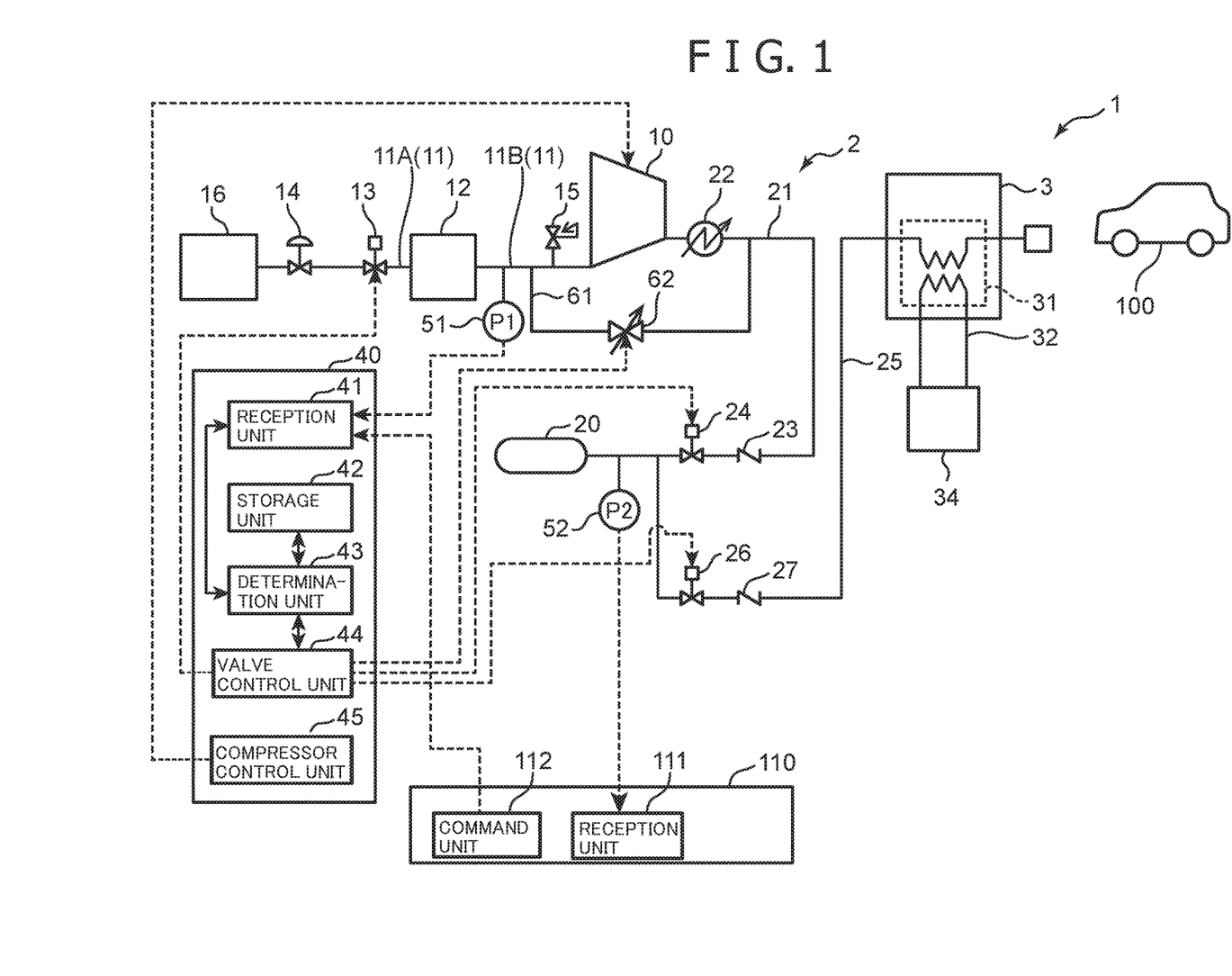
FIG. 1 is a view schematically showing a configuration of a hydrogen station and a compression system according to a first embodiment of the present invention.

As shown in FIG. 1, the check valve 23 is provided on a portion of the discharge flow passage 21 downstream (on a side of the accumulator 20) of the cooler 22 and impedes a flow (a back flow) of hydrogen gas from the side of the accumulator 20 to the side of the compressor 10. The second on-off valve 24 is a valve for switching between the inflow of hydrogen gas into the accumulator 20 and the stop of the inflow, and is provided on a portion of the discharge flow passage 21 downstream of the check valve 23.

The second pressure detection section 52 is a sensor that detects the pressure of hydrogen gas in the discharge flow passage 21, and is provided on a portion of the discharge flow passage 21 downstream of the second on-off valve 24 (in the vicinity of the inlet of the accumulator 20) in this embodiment. The second pressure detection section 52 transmits a detection signal in accordance with the pressure of hydrogen gas to a station control unit 110 that controls the entire hydrogen station 1. As shown in FIG. 1, the station control unit 110 includes a reception unit 111 that receives the detection signal transmitted from the second pressure detection section 52, and a command unit 112 that transmits a control command to the compression system control unit 40.

The accumulator 20 stores the hydrogen gas discharged from the compressor 10. The accumulator 20 has a design pressure of, for example, 82 MPa. As shown in FIG. 1, a supply passage 25 has an upstream end connected to a portion of the discharge flow passage 21 between the second on-off valve 24 and the second pressure detection section 52. The supply passage 25 is a flow passage for introducing the hydrogen gas in the accumulator 20 into the dispenser 3. As shown in FIG. 1, a third on-off valve 26 and a check valve 27 are provided in the supply passage 25 in order from the upstream side, and the supply passage 25 has a downstream end connected to an inlet of the dispenser 3. The third on-off valve 26 is opened with the second on-off valve 24 closed, so that the hydrogen gas in the accumulator 20 is supplied to the dispenser 3 through the supply passage 25.

The bypass flow passage 61 is a flow passage for flowing back hydrogen gas from the discharge side to the suction side of the compressor 10, and connects the suction flow passage 11 and the discharge flow passage 21 to detour the compressor 10. As described above, since the compressor 10 in this embodiment is configured as a multi-stage compressor, the hydrogen gas discharged from the compression chamber of the final stage flows back to the suction side through the bypass flow passage 61, and flows into the compression chamber of the first stage.

As shown in FIG. 1, the bypass flow passage 61 has an end portion (an upstream end) on the suction side of the compressor 10 connected a part of the second suction flow passage 11B downstream of the first pressure detection section 51 and upstream of the safety valve 15 (a part downstream of the pressure reducing valve 14). Further, the bypass flow passage 61 has an end portion (a downstream end) on the discharge side of the compressor 10 connected to a part of the discharge flow passage 21 downstream of the cooler 22 and upstream of the check valve 23.

The bypass valve 62 is provided on the bypass flow passage 61 and regulates the amount of hydrogen gas flowing from the discharge flow passage 21 into the bypass flow passage 61. The bypass valve 62 is an automatic control valve configured to be capable of regulating an opening by the compression system control unit 40.

The compression system control unit 40 is a computer that controls various operations of the compression system 2, and includes a reception unit 41, a storage unit 42, a determination unit 43, a valve control unit 44, and a compressor control unit 45. The reception unit 41, the determination unit 43, the valve control unit 44, and the compressor control unit 45 are functions executed by a central processing unit (CPU) that constitutes the computer, and the storage unit 42 is constituted by a storage device such as a memory.

The reception unit 41 receives the detection signal transmitted from the first pressure detection section 51, and also receives the control command transmitted from the station control unit 110 (the command unit 112). The storage unit 42 stores data of a first threshold value and a second threshold value which are predetermined for the pressure in the suction flow passage 11 (more accurately, in the flow passage portion between the first on-off valve 13 and the compressor 10). The first threshold value is a value that is set based on a predetermined compression ratio of the compressor 10.

The determination unit 43 compares the pressure detected by the first pressure detection section 51 and the first threshold, and determines the magnitude relation. Further, the determination unit 43 compares the pressure detected by the first pressure detection section 51 with the second threshold value and determines the magnitude relation.

The valve control unit 44 switches between the opening and closing of the first on-off valve 13, the second on-off valve 24, and the third on-off valve 26, and regulates the opening of the bypass valve 62 based on the determination result of the determination unit 43. The compressor control unit 45 switches between the drive and stop of the compressor 10 (turning on/off of the motor), and controls the rotational speed of the compressor 10.

The compression system control unit 40 closes the first on-off valve 13 while driving the compressor 10 based on the completion of gas filling into the accumulator 20, opens the bypass valve 62 after the closing operation of the first on-off valve 13, and closes the second on-off valve 24 after the opening operation of the bypass valve 62, and continues to drive the compressor 10 after the closing operation of the second on-off valve 24. The details of this control will be described later in the description of a method for controlling a compression system.

The dispenser 3 refuels the fuel cell vehicle 100 with the hydrogen gas supplied from the compression system 2. As shown in FIG. 1, a precooler 31 is built in the dispenser 3, and the precooler 31 is connected to each of a supply passage 25 for hydrogen gas and a brine flow passage 32. The hydrogen gas supplied from the accumulator 20 to the dispenser 3 through the supply passage 25 is cooled by heat exchange with brine in the precooler 31.

As shown in FIG. 1, the compression system 2 further includes a refrigerator 34, and the brine after heat exchange with hydrogen gas is cooled by the refrigerator 34 and is then supplied to the precooler 31 again through the brine flow passage 32. That is, the brine can be circulated between the precooler 31 and the refrigerator 34 through the brine flow passage 32.

Figure 2:
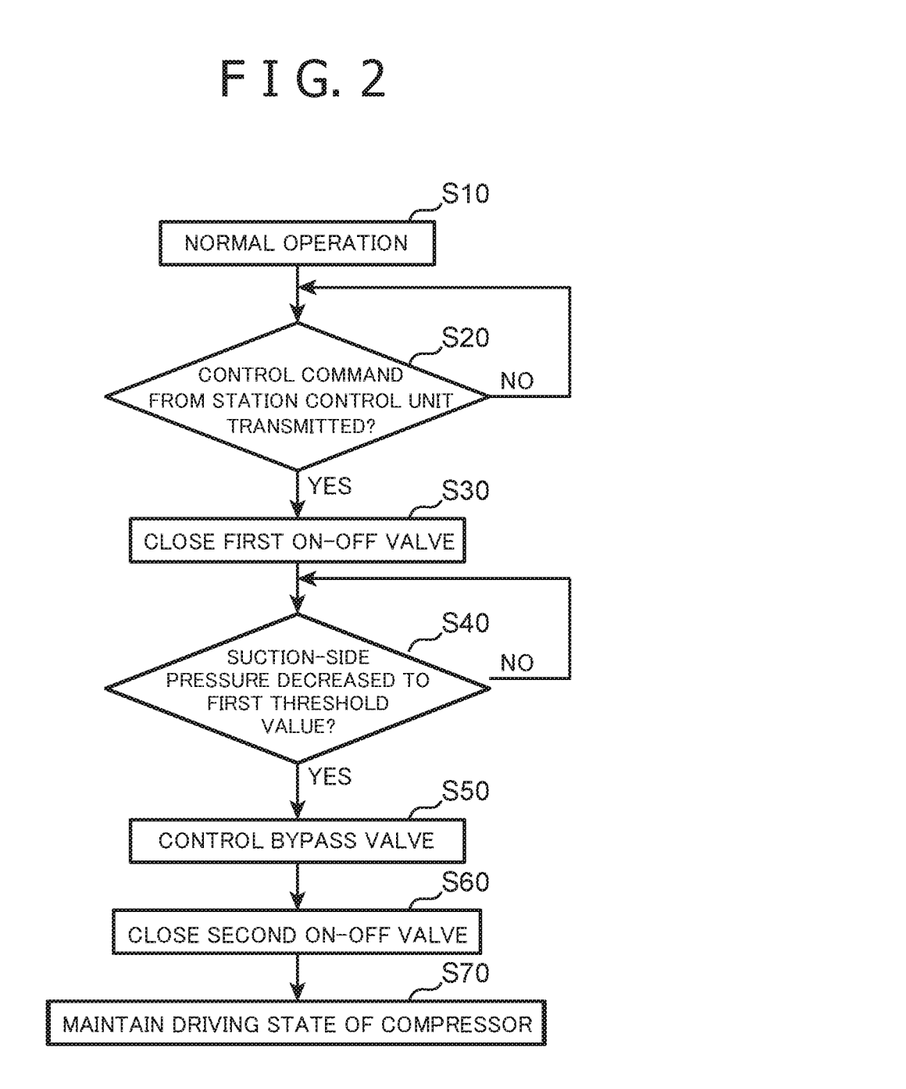
FIG. 2 is a flowchart describing a method for controlling the compression system according to the first embodiment of the present invention.

Next, a method for controlling the compression system 2 will be described according to the flowchart of FIG. 2.

First, during the normal operation of the compression system 2 (step S10), with the first on-off valve 13 open, the bypass valve 62 fully closed, and the second on-off valve 24 open, the compressor 10 is driven at a predetermined rotational speed (a rated rotational speed).

Accordingly, the hydrogen gas in the trailer tank 16 is sucked into the compressor 10 through the suction flow passage 11, the high-pressure hydrogen gas discharged from the compressor 10 flows into the accumulator 20 through the discharge flow passage 21, and the accumulator 20 is filled with the hydrogen gas.

During the normal operation, the pressure in the vicinity of the inlet of the accumulator 20 is monitored by the second pressure detection section 52. Then, when the pressure in the accumulator 20 almost reaches the set pressure (82 MPa in this embodiment), the control command for switching the compression system 2 from the normal operation to the idling operation is transmitted from the station control unit 110 (the command unit 112) to the compression system control unit 40 (the reception unit 41) (YES in step S20). Upon receiving the control command, the compression system control unit 40 switches the first on-off valve 13 from the open state to the closed state while driving the compressor 10 (step S30). That is, the compression system control unit 40 (the valve control unit 44) in this embodiment closes the first on-off valve 13 based on the completion of gas filling into the accumulator 20.

When the first on-off valve 13 is closed, the suction of hydrogen gas into the compressor 10 is stopped, and the pressure in the suction flow passage 11 (a part downstream of the first on-off valve 13) gradually decreases. During this time, the change in pressure in the suction flow passage 11 is monitored by the first pressure detection section 51.

Then, when the pressure on the suction side of the compressor 10, that is, the pressure in the flow passage portion between the compressor 10 and the first on-off valve 13, decreases to the first threshold value (0.4 MPa in this embodiment) (YES in step S40), the valve control unit 44 starts to open the bypass valve 62 (step S50). Here, the first threshold value is a value obtained by dividing the pressure on the discharge side of the compressor 10 (that is, the pressure in the flow passage portion between the compressor 10 and the second on-off valve 24) by a preset compression ratio, that is, the lowest allowable pressure value on the suction side of the compressor 10. In addition, the pressure on the discharge side does not necessarily have to be the pressure value actually acquired, and the set pressure of the accumulator 20 may be regarded as the pressure on the discharge side. Accordingly, a part of the hydrogen gas discharged from the compressor 10 is flown back to the suction flow passage 11 (the second suction flow passage 11B) through the bypass flow passage 61, and the pressure on the suction side of the compressor 10 increases, so that the pressure difference between the suction side of the compressor 10 and the discharge side thereof is reduced. In addition, when the compressor 10 is a multi-stage compressor, the first threshold value is set so that the ratio between the suction pressure at the first stage and the discharge pressure at the final stage does not exceed the preset compression ratio.

The valve control unit 44 gradually increases the opening of the bypass valve 62 while maintaining the pressure detected by the first pressure detection section 51 below the second threshold value. Here, the second threshold value is a value lower than a value that is set for operating the safety valve 15 as a reference. The second threshold is a value larger than the first threshold.

After the opening of the bypass valve 62 is increased in step S50, the determination unit 43 determines whether the pressure detected by the first pressure detection section 51 is below the second threshold value. Then, when the detected pressure is equal to or higher than the second threshold value, the valve control unit 44 reduces the opening of the bypass valve 62. On the other hand, when the detected pressure is below the second threshold value and the bypass valve 62 is not in the fully opened state, the valve control unit 44 further increases the opening of the bypass valve 62.

In this way, until the bypass valve 62 is fully opened, the opening of the bypass valve 62 is increased gradually (in stages) over time while the pressure on the suction side of the compressor 10 (the pressure detected by the first pressure detection section 51) is monitored. This allows the safety valve 15 to be prevented from operating to release the hydrogen gas to the outside of the suction flow passage 11 during the opening regulation of the bypass valve 62.

Then, when the bypass valve 62 is fully opened, the valve control unit 44 closes the second on-off valve 24 (step S60). In this state, the pressures on the suction side and the discharge side of the compressor 10 are equalized, and the pressures are lower than the working pressure of the safety valve 15.

In this method, the compression system control unit 40 (the compressor control unit 45) continues to drive the compressor 10 (idling operation) after the closing operation of the second on-off valve 24 (step S70). That is, the compressor control unit 45 continues the motor drive of the compressor 10 after the step S60. During the idling operation, hydrogen gas circulating in the bypass flow passage 61 flows into the compressor 10, but compression operation is not substantially performed. Further, the compressor control unit 45 maintains the rotational speed of the compressor 10 at the rotational speed of the compressor 10 before the closing operation of the first on-off valve 13 (that is, the same rotational speed as the rotational speed during the normal operation in step S10) during a period from the closing operation of the first on-off valve 13 to the closing operation of the second on-off valve 24 and after the closing operation of the second on-off valve 24.

Then, when the hydrogen gas in the accumulator 20 is supplied to the dispenser 3 to be consumed during the idling operation of the compression system 2, a control command for refilling the accumulator 20 with the hydrogen gas is transmitted from the station control unit 110 (the command unit 112) to the compression system control unit 40 (the reception unit 41). Upon receiving the control command, the valve control unit 44 switches the first on-off valve 13 and the second on-off valve 24 from the closed state to the open state and switches the bypass valve 62 from the fully open state to the fully closed state in order to return the compression system 2 from the idling operation to the normal operation. At this time, the compressor control unit 45 does not need to restart the compressor 10 and also does not need to change the rotational speed of the compressor 10.

The method for controlling the compression system according to the embodiment of the present invention has been described above. In this method, after the first on-off valve 13 is closed, the compressor 10 continues to be driven to fill the accumulator 20 with hydrogen gas, so that the hydrogen gas remaining between the first on-off valve 13 and the compressor 10 can be sufficiently reduced.

Further, a part of the hydrogen gas is flown back from the discharge side to the suction side of the compressor 10 through the bypass flow passage 61, so that the pressure of the hydrogen gas between the first on-off valve 13 and the compressor 10 is prevented from abruptly decreasing, and the pressure ratio between the pressures on the suction side and the discharge side of the compressor 10 is prevented from exceeding a preset compression ratio. In the compression system 2, since the pressure on the suction side of the compressor 10 is reduced by the pressure reducing valve 14, the pressure difference between the suction side and the discharge side of the compressor 10 is initially large. Therefore, the technique of flowing back the hydrogen gas to maintain the pressure on the suction side of the compressor 10 is particularly preferred.

Further, the opening of the bypass valve 62 is increased while the pressure on the suction side of the compressor 10 is maintained below the second threshold value, so that an abrupt increase in pressure of the hydrogen gas is prevented, and the safety valve 15 is also prevented from operating. In the compression system 2, the pressure is likely to increase when the high-pressure hydrogen gas is flown back all at once to the suction flow passage 11 in which the pressure is reduced by the pressure reducing valve 14. Therefore, the technique of controlling the opening of the bypass valve 62 is particularly preferable.

Further, since an increase in pressure on the suction side of the compressor 10 is prevented, the buffer tank 12 can be small in capacity.

In this method, the driving state of the compressor 10 is maintained, so that the compressor 10 is not required to be restarted when the accumulator 20 needs to be refilled with hydrogen gas, and it is possible to smoothly return to the normal operation. Therefore, the time and effort required for restarting the compressor 10 can be reduced.

In the compression system 2, the idling operation continues to be maintained even after the second on-off valve 24 is closed (step S70), however it does not necessarily continue to be permanently maintained, and when the control command for stopping the compression system 2 without returning it to the normal operation is transmitted from the station control unit 110 to the compression system control unit 40, the compressor 10 can be stopped.

When receiving this control command, the compression system control unit 40 (the compressor control unit 45) stops the driving of the compressor 10. In this way, not only the case of returning from the idling operation to the normal operation, but also the case of temporarily performing the idling operation and then switching it to the stop of the operation is included in the scope of the present invention.

Second Embodiment

Next, a second embodiment of the present invention will be described based on FIG. 3. The second embodiment is basically the same as the first embodiment, but is different from the first embodiment in that the accumulator 20 is not provided and hydrogen gas is directly supplied from the compressor 10 to the dispenser 3. Only the difference from the first embodiment will be described below. In addition, in FIG. 3, the same components as those of the first embodiment (FIG. 1) are denoted by the same reference numerals, and the description thereof will be omitted.

Figure 3:
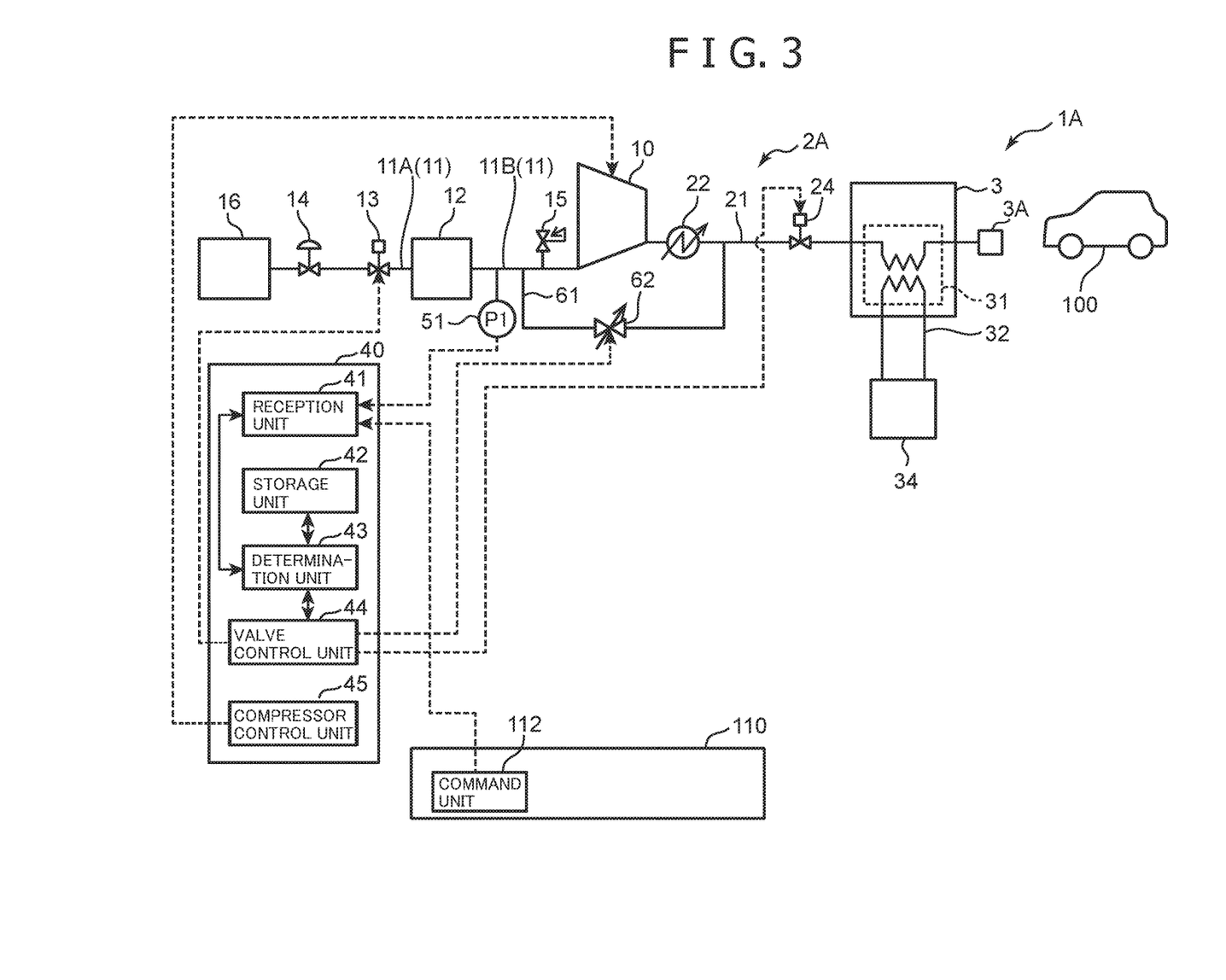
FIG. 3 is a view schematically showing a configuration of a hydrogen station and a compression system according to a second embodiment of the present invention.

As shown in FIG. 3, in a hydrogen station 1A according to the second embodiment, the discharge flow passage 21 has an upstream end connected to the discharge port of the compressor 10 and a downstream end connected to the inlet of the dispenser 3. Therefore, the hydrogen gas compressed by the compressor 10 is supplied to the dispenser 3 through the discharge flow passage 21, is cooled by the brine in the precooler 31, and is then supplied to the fuel cell vehicle 100 from a nozzle 3A. In the method for controlling the compression system 2A according to this embodiment, when there is no request for hydrogen gas from the dispenser 3, the first on-off valve 13 is closed and thereafter the steps S40 to S70 in FIG. 2 is sequentially performed, so that the compression system 2A is switched from the normal operation to the idling operation.

It should be understood that the embodiments disclosed herein are illustrative but not restrictive in all aspects. The scope of the present invention is defined not by the above description but by the claims, and is intended to include all variations within the meaning and range of equivalency of the claims. Therefore, the following modifications are also included in the scope of the present invention.

In the embodiments described above, the case where the bypass valve 62 starts to be opened when the pressure detected by the first pressure detection section 51 decreases to the first threshold value after the first on-off valve 13 is closed, has been described as an example, but, the bypass valve 62 may start to be opened after a predetermined time has elapsed after the first on-off valve 13 is closed. Further, the present invention is not limited to the case where there is a time difference between the timing of closing the first on-off valve 13 and the timing of opening the bypass valve 62. That is, the compression system control unit 40 (the valve control unit 44) may start to open the bypass valve 62 at the same time as the closing operation of the first on-off valve 13.

In the embodiments described above, the case where the second on-off valve 24 is closed after the bypass valve 62 is fully opened, has been described, but the present invention is not limited to this. For example, the second on-off valve 24 may be closed when a predetermined time has elapsed from the timing when the bypass valve 62 is opened. Further, the second on-off valve 24 may be closed at a timing when the opening of the bypass valve 62 reaches a predetermined opening smaller than the opening thereof in the fully open state.

In the embodiments described above, the case where during the control from the closing operation of the first on-off valve 13 to the closing operation of the second on-off valve 24, the rotation speed of the compressor 10 is maintained at the rotation speed during the normal operation, has been described. However, during the control, the rotational speed of the compressor 10 may be reduced compared with that during the normal operation (for example, 60% of the rotational speed during the normal operation).

In the first embodiment described above, the case where only one accumulator 20 is provided has been described as an example. A plurality of accumulator systems, each of which includes the accumulator 20, the second on-off valve 24, the third on-off valve 26, and the check valves 23, 27, may be provided in parallel.

What is claimed is:

1. A method for controlling a compression system that includes a compressor for compressing gas, a first on-off valve provided on a suction flow passage connected to a suction side of the compressor, a pressure reducing valve provided on a portion of the suction flow passage upstream of the first on-off valve, a second on-off valve provided on a discharge flow passage connected to a discharge side of the compressor, a bypass flow passage connecting the suction flow passage and the discharge flow passage to detour the compressor, and a bypass valve provided on the bypass flow passage, the method comprising:
   closing the first on-off valve while driving the compressor;
   opening the bypass valve at the same time as the closing operation of the first on-off valve or after the closing operation of the first on-off valve;
   closing the second on-off valve after the opening operation of the bypass valve; and
   continuing to drive the compressor after the closing operation of the second on-off valve.

2. The method for controlling a compressor system according to claim 1,
   wherein the bypass valve is opened after the closing operation of the first on-off valve and when a pressure in the suction flow passage decreases to a first threshold value, and
   wherein the first threshold is set based on a predetermined compression ratio of the compressor.

3. The method for controlling a compressor system according to claim 2,
   wherein the bypass valve is configured to be capable of regulating an opening,
   wherein the compression system further includes a buffer tank that is arranged on the suction flow passage and stores gas, and a pressure detection section that detects the pressure in the suction flow passage, and
   wherein the opening of the bypass valve is increased while the pressure detected by the pressure detection section is maintained below a second threshold value.

4. The method for controlling a compression system according to claim 3,
   wherein the compression system further includes a cooler that is provided on the discharge passage and cools gas discharged from the compressor, and wherein an end portion of the bypass flow passage on the discharge side of the compressor is connected to a part of the discharge flow passage downstream of the cooler.

5. The method for controlling a compression system according to claim 1,
wherein during a period from the closing operation of the first on-off valve to the closing operation of the second on-off valve, and after the closing operation of the second on-off valve, a rotational speed of the compressor is maintained at a rotational speed of the compressor before the closing operation of the first on-off valve.

6. A compression system, comprising:
a compressor for compressing gas;
a first on-off valve provided on a suction flow passage connected to a suction side of the compressor;
a pressure reducing valve provided on a portion of the suction flow passage upstream of the first on-off valve;
a second on-off valve provided on a discharge flow passage connected to a discharge side of the compressor;
a bypass flow passage connecting the suction flow passage and the discharge flow passage to detour the compressor;
a bypass valve provided on the bypass flow passage; and
a control unit that controls the compressor, the first on-off valve, the second on-off valve, and the bypass valve,
wherein the control unit performs a control to close the first on-off valve while driving the compressor, open the bypass valve at the same time as the closing operation of the first on-off valve or after the closing operation of the first on-off valve, close the second on-off valve after the opening operation of the bypass valve, and continue to drive the compressor after the closing operation of the second on-off valve.

7. A hydrogen station, comprising:
the compression system according to claim 6, the compression system for compressing hydrogen gas to a predetermined pressure; and
a dispenser that refuels a fuel cell vehicle with hydrogen gas supplied from the compression system.

\* \* \* \* \*